United States Patent
Hauser

(12) United States Patent (10) Patent No.: US 6,599,218 B1
Hauser (45) Date of Patent: *Jul. 29, 2003

(54) TRANSAXLE DRIVE DIFFERENTIAL ASSEMBLY

(76) Inventor: Raymond Hauser, R.R. 3, Box 383, Sullivan, IL (US) 61951

( * ) Notice: Subject to any disclaimer, the term of this patent is extended or adjusted under 35 U.S.C. 154(b) by 18 days.

This patent is subject to a terminal disclaimer.

(21) Appl. No.: 10/037,777

(22) Filed: Jan. 4, 2002

Related U.S. Application Data

(63) Continuation of application No. 09/614,307, filed on Jul. 12, 2000, now Pat. No. 6,338,690, which is a continuation of application No. 09/394,025, filed on Sep. 10, 1999, now Pat. No. 6,135,911, which is a continuation of application No. 09/152,902, filed on Sep. 14, 1998, now Pat. No. 6,024,665, which is a continuation of application No. 08/700,934, filed on Aug. 23, 1996, now Pat. No. 5,807,200.

(51) Int. Cl.$^7$ ............................................. F16H 48/06
(52) U.S. Cl. ............................................................ 475/230
(58) Field of Search ................................................ 475/230

(56) References Cited

U.S. PATENT DOCUMENTS

| | | | |
|---|---|---|---|
| 4,182,201 A | * | 1/1980 | Mayhew et al. |
| 4,244,241 A | | 1/1981 | Treadwell |
| 4,480,500 A | | 11/1984 | Yamamori et al. |
| 4,480,501 A | | 11/1984 | von Kaler |
| 4,781,259 A | | 11/1988 | Yamaoka et al. |
| 4,867,008 A | | 9/1989 | Yamaoka et al. |
| 4,907,470 A | | 3/1990 | Kasemeier et al. |
| 4,979,582 A | | 12/1990 | Forster |
| 5,330,394 A | | 7/1994 | Hauser |
| 5,404,772 A | | 4/1995 | Jester |
| 5,528,958 A | | 6/1996 | Hauser |
| 5,555,727 A | | 9/1996 | Hauser et al. |
| 5,557,931 A | | 9/1996 | Hauser et al. |
| 5,628,189 A | | 5/1997 | Hauser et al. |
| 5,664,465 A | | 9/1997 | Okada et al. |
| 5,807,200 A | | 9/1998 | Hauser |
| 5,819,535 A | | 10/1998 | Smothers et al. |
| 5,863,271 A | | 1/1999 | Schreier et al. |
| 6,015,362 A | | 1/2000 | Irikura et al. |
| 6,024,665 A | * | 2/2000 | Hauser ........................ 475/230 |
| 6,056,663 A | | 5/2000 | Fett |
| 6,135,911 A | * | 10/2000 | Hauser ........................ 475/230 |
| 6,338,690 B1 | * | 1/2002 | Hauser ........................ 475/83 |

* cited by examiner

*Primary Examiner*—Dirk Wright

(57) ABSTRACT

A transaxle drive differential assembly powered by an input drive and connected to a pair of axle shafts. The differential assembly includes a housing comprised of a first housing section and a second housing section wherein at least one of the housing sections has a bearing surface. A ring gear, drivingly linked to the input drive, has an inner circumference which is supported on the bearing surface and may have a carrier plate integrally formed therewith. A differential is drivingly linked to the ring gear and is adapted to drive the pair of axle shafts.

3 Claims, 6 Drawing Sheets

TRANSAXLE DRIVE DIFFERENTIAL ASSEMBLY

This application is a continuation of application Ser. No. 09/614,307 filed Jul. 12, 2000, which is a continuation of application Ser. No. 09/394,025 filed on Sep. 10, 1999, which is a continuation of application Ser. No. 09/152,902 filed on Sep. 14, 1998, issued as U.S. Pat. No. 6,024,665, which is a continuation of application Ser. No. 08/700,934 filed on Aug. 23, 1996, issued as U.S. Pat. No. 5,807,200. Pursuant to 35 U.S.C §120 and 37 C.F.R. 1.78, this continuation application is entitled to, and claims, a filing date of Aug. 23, 1996.

BACKGROUND OF THE INVENTION

This invention relates generally to axle drives for motor vehicles and, more particularly, to a transaxle drive differential assembly.

As is known, the use of a differential assembly in the transmission system of a motor vehicle allows the wheels to spin at different speeds. In the case of a vehicle traveling in a straight line, the axle shafts connected to the differential assembly will rotate at the same speed. However, when a turn or curve is encountered, the axle shaft nearest the inside of the turn will slow in rotational speed while the outer axle shaft will simultaneously increase in rotational speed. As such, the wheels, driven by the axle shafts, are prevented from scuffing the surface across which they travel.

An example of a transaxle drive differential assembly for motor vehicles may be seen in U.S. Pat. No. 4,232,569, issued on Nov. 11, 1980. In the differential assembly disclosed in the '569 patent, the ring gear which carries the differential gearing is configured with a reduced outer diameter adjacent to the gear teeth. This diameter forms a stepped surface which is placed in contact with a mating surface formed in the housing which acts as a plain bearing surface for the differential assembly. The principal advantage of this configuration is the compact configuration provided to the differential assembly and the use of the housing to take up the gear separating forces instead of the axle shafts.

While the differential assembly disclosed in the '569 patent works well for its intended purposes, this configuration does suffer disadvantages. In particular, the fabrication of the ring gear is relatively expensive in that the step adjacent to the gear teeth requires a larger part size which is costlier when compared to comparable strength differential ring gears. The cost is attributable to the additional material, the requirements of handling a larger part, and the larger manufacturing machine size required. Even in a configuration where the part can be potentially formed in a net shape via sintered powder metal, the stepped gear configuration is not desirable due to stresses caused at the transition between the larger and smaller diameters and due to variations in the densities of the sintered metal.

Additionally, in the '569 patent, the differential configuration disclosed is used in a housing with a horizontal split line. This split line configuration requires relatively high tolerances between upper and lower housing sections to reduce discontinuities at the split line. Any such discontinuities between the upper and lower housing sections create a step that can cause uneven loading of forces between the housing sections as well as binding of the differential and increased noise.

A further differential assembly design is disclosed in U.S. Pat. No. 4,480,501 issued on Nov. 6, 1984. In the configuration disclosed in the '501 patent the tips of the gear teeth of the ring gear are used as a plain bearing surface in contact with a bearing shoe that forms a mating plain bearing surface. This arrangement eliminates the problems caused by discontinuities between housing halves and allows the use of a narrower ring gear since the need for a step is eliminated. However, this arrangement suffers the disadvantage of requiring the gear teeth to be used as plain bearings which causes additional wear of the gear teeth and the potential for greater than usual contamination of the gear box assembly. A further disadvantage is the requirement of fabricating and retaining the bearing shoe and the associated additional cost and complexity of manufacture. Yet another disadvantage associated with both the '569 and '501 patents is the need to configure the ring gear to carry the bevel gears, or to increase the size of the bevel gears in order to match the internal diameter of the ring gear. As such, the gear sizes are optimized not for transmitted torque but for the space required to fit the bevel gears.

From the foregoing, it is clear that there is a unfulfilled need in the art for an improved transaxle drive differential assembly which is free of the disadvantages above-described. Accordingly, it is an object of the present invention to provide a transaxle drive differential assembly having improved cooperable bearing surfaces whereby the need to provide a bearing shoe or ring gear with a stepped surface is eliminated. It is a further object of the present invention to provide a differential assembly having a reduced number of fasteners thereby making the differential assembly easier to manufacture.

SUMMARY OF THE INVENTION

In accordance with the present invention, a transaxle drive differential assembly powered by an input drive and connected to a pair of axle shafts is provided. The differential assembly includes a housing comprised of a first housing section and a second housing section wherein at least one of the housing sections has a bearing surface. A ring gear, drivingly linked to the input drive, has an inner circumference which is supported on the bearing surface. A differential is drivingly linked to the ring gear and is adapted to drive the pair of axle shafts.

More specifically, the present invention is directed to a hydrostatic transaxle powered by an input drive and connected to a pair of wheels. The transaxle includes a housing comprised of a first housing section and a second housing section wherein at least one of the housing sections has a bearing surface. A hydrostatic transmission is mounted within the housing and has a center section on which is mounted a hydraulic pump and a hydraulic motor. The hydraulic pump is drivingly engaged to the input drive and linked to the hydraulic motor. A ring gear is drivingly linked to the hydraulic motor and has an inner circumference which is supported on the bearing surface. A pair of axle shafts are supported by the housing on which the wheels are mounted and a differential, drivingly linked to the ring gear, is adapted to drive the pair of axle shafts and, accordingly, the wheels.

A better understanding of the objects, advantages, features, properties and relationships of the invention will be obtained from the following detailed description and accompanying drawings which set forth an illustrative embodiment and is indicative of the various ways in which the principles of the invention may be employed.

BRIEF DESCRIPTION OF THE DRAWINGS

For a better understanding of the invention, reference may be had to the preferred embodiments shown in the following drawings in which.

DETAILED DESCRIPTION

Figure 1:
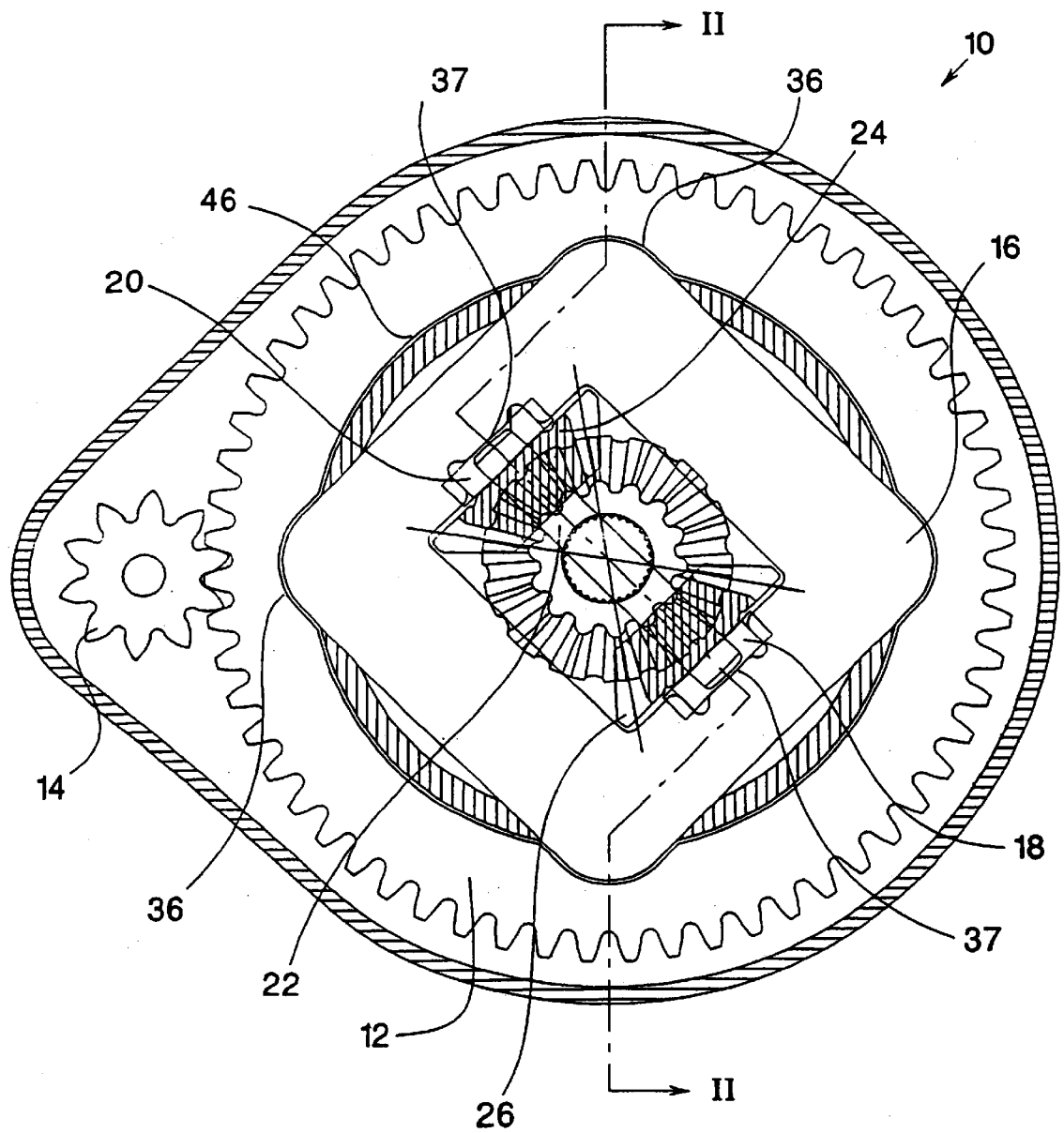
FIG. 1 illustrates a side view of a transaxle drive differential assembly constructed in accordance with the present invention.

Referring now to the figures, wherein like reference numerals refer to like elements, a differential assembly 10 constructed in accordance with the present invention is illustrated. In particular, the differential assembly 10 comprises a ring gear 12 which drivingly connects with an input drive gear 14. The input drive gear 14 may be a separate gear matingly attached to a rotating drive shaft, a geared rotating drive shaft, or other like type of drive arrangement. The ring gear 12, in turn, matingly connects with a differential carrier plate 16 of simple construction which carries a pair of oppositely disposed bearing blocks 18,20.

More specifically, the differential carrier plate 16 is provided with a generally rectangular, planar geometry having corners which are adapted to be floatingly, drivingly supported within recesses 36 formed in the inner circumference of the ring gear 12. In the preferred embodiment of the invention, the corners are generally rounded in geometry. Furthermore, while it is preferred that the differential carrier plate 16 be formed separate from the ring gear 12 to simplify fabrication of the ring gear 12, it is contemplated that the differential carrier plate 16 could be formed as an integral part of the ring gear 12.

To allow the bearing blocks 18,20 to be carried by the differential carrier plate 16, the differential carrier plate is provided with oppositely disposed recesses 37 in which a respective one of the bearing blocks 18,20 are positioned. Meanwhile, the bearing blocks 18,20 are each provided with oppositely disposed slots 38 which are adapted to matingly engage with the shoulders 39 of the differential carrier plate in the region adjacent to the recesses 37. While the bearing blocks 18,20 have been depicted as plain bearings, the bearing blocks may also be roller bearing elements. It is also anticipated that the bearing blocks 18,20 may be attached to the differential carrier plate 16 by configurations other than that depicted, such as through the use of a fastener or the like.

The bearing blocks 18,20 rotatably support a cross shaft 22 on which are oppositely disposed bevel planet gears 24,26. The bevel planet gears 24,26 are drivingly connected with two oppositely disposed bevel drive gears 28,30 which matingly engage to the axle shafts 32,34 and interlocked therewith by means of a spline. Retaining rings 40 are further used to retain the bevel drive gears 28,30 on the axle shafts 32,34. Journal bearings 50 are also associated with the housing for use in supporting the axle shafts 32,34. The bevel planet gears 24,26 are rotatably supported by the cross shaft 22 and are constrained along the axis of the cross shaft 22 by the bearing blocks 18,20 and contact with the bevel drive gears 28,30.

Figure 2:
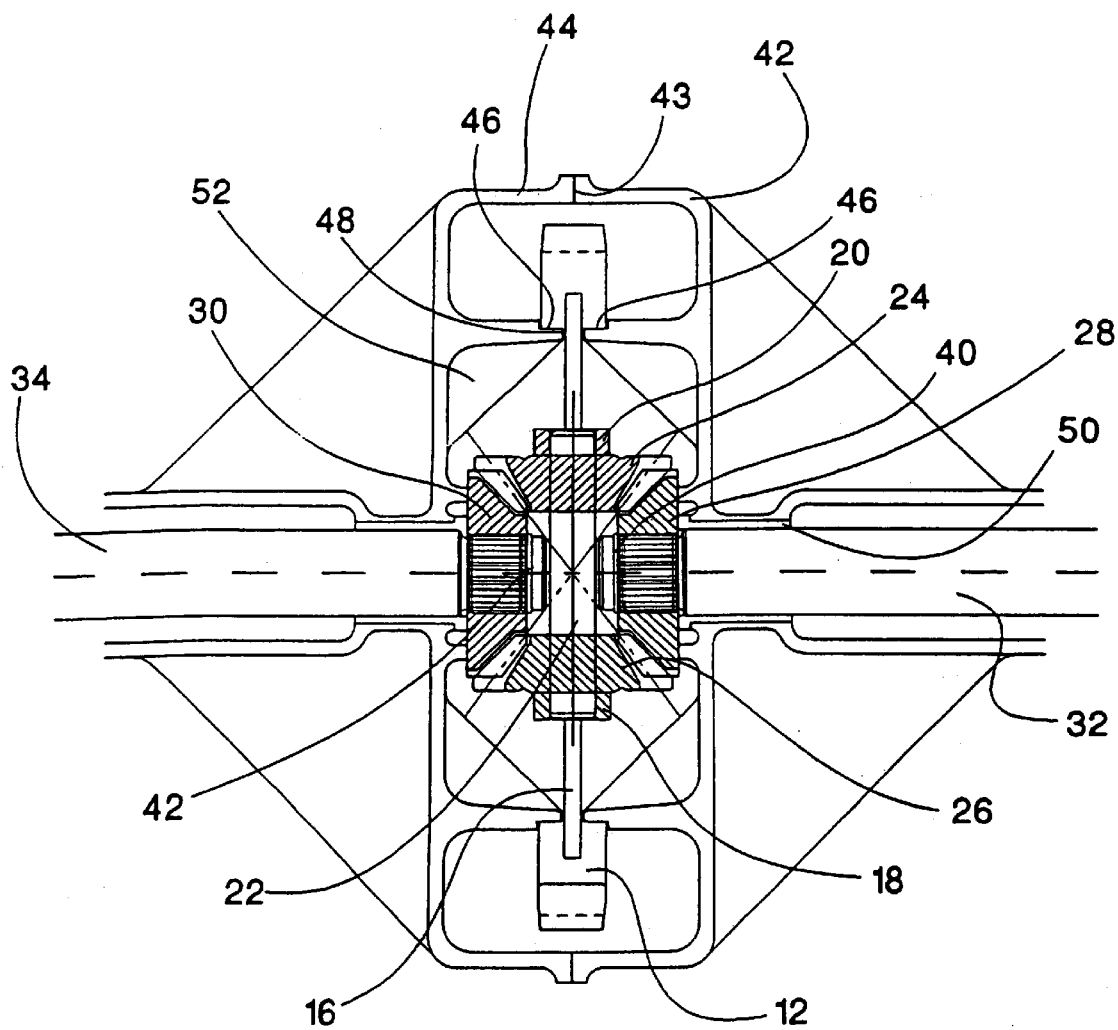
FIG. 2 illustrates a sectional view of the transaxle drive differential assembly of FIG. 1 along line II—II thereof.
Figure 3:
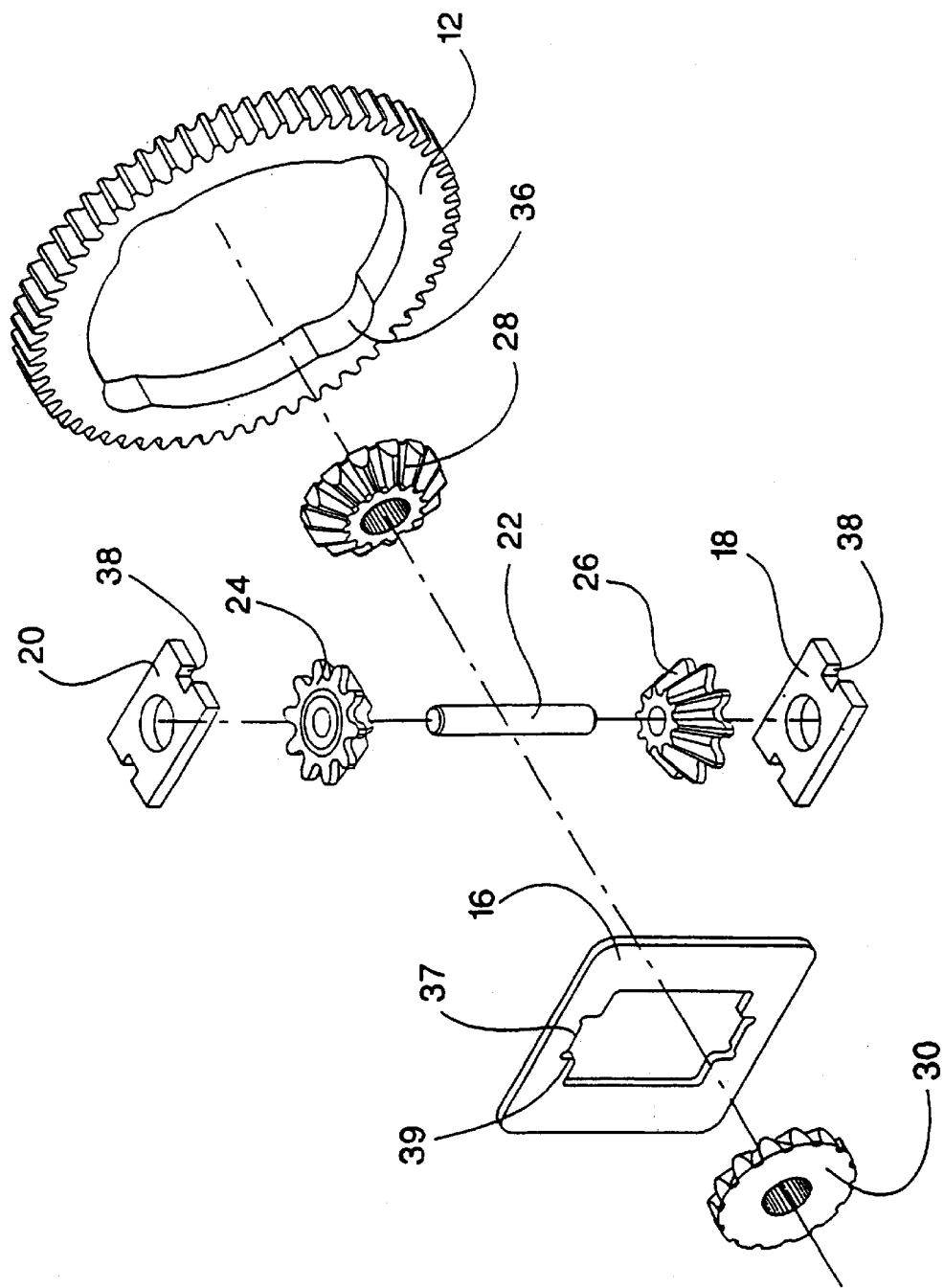
FIG. 3 illustrates an isometric view of the components of the transaxle drive differential assembly of FIG. 1.

As best illustrated in FIG. 2, the differential assembly 10 is carried within a housing comprised of at least two housing sections 42,44 which matingly engage along a substantially vertical split line 43. More particularly, each of the housing sections 42,44 comprises a bearing surface 46 adapted to support the differential assembly 10 during its operation, in particular, the inner circumference of the ring gear 12. Preferably, the bearing surfaces 46 are stepped in order to prevent side to side motion of the ring gear 12 which is supported thereupon. The stepped bearing surface 46 may be formed into the housing sections 42,44 using a net shape process such as die casting or may be formed into the housing by use of a machining technology.

When the housing sections 42,44 are joined, the stepped bearing surfaces 46 of each housing section 42,44 are preferred to be symmetrically disposed about the split line and spaced therefrom. In this manner, the stepped bearing surfaces 46 are arranged to create a guide slot 48 which comprises plain bearing surfaces between which the differential carrier plate 18 is run. In this embodiment, the plate 16 lies in the same plane as the split line 43.

During operation, the input drive gear 14 transfers a motive force, received from a vehicle engine (not shown), to the ring gear 12 of the differential assembly 10. The motive force from the vehicle engine may be reduced through the use of gear reductions before it is applied to the input drive gear 14. More specifically, the motive force from the vehicle engine will cause the input drive gear 14 to rotate which, in turn, will drive the ring gear 12 about the stepped bearing surfaces 46. As the ring gear 12 rotates, the ring gear 12 will carry the differential carrier plate 16 and, accordingly, the cross shaft 22 and bevel planet gears 24,26. This arrangement of components drives the bevel drive gears 28,30 and the axle shafts 32,34 which are drivingly connected thereto. In this manner, the motive force from the vehicle engine is transferred to the axle shafts 32,34 for the purpose of driving wheels (not shown) mounted thereon. It is to be understood that the components will be lubricated by oil, grease, or other friction reducing materials known in the art for the purpose of allowing the components to move freely within the housing.

With the arrangement above-described, the housing features that form the bearing surfaces for the ring gear 12 function to absorb the gear separating forces imparted on the ring gear 12 by the input drive 14. As such, ribs 52 may be further formed within the housing sections 42,44 for the purpose of providing added support to the stepped bearing surfaces 46. Furthermore, since the gear separating forces are absorbed by the housing instead of being transmitted through the differential assembly 10, the components which comprises the differential assembly 10 and the axle shafts 32,34 need only be sized to accommodate the requirements associated with torque transmission. In addition, the above-described arrangement is seen to provide reduced loading on the axle shaft journal bearings 50 and the axle shafts 32,34. Still further, since the differential assembly 10 is not deflected by the gear separating forces, the tendency of the axle shafts 32,34 to bind under high loads is substantially reduced.

Figure 5:
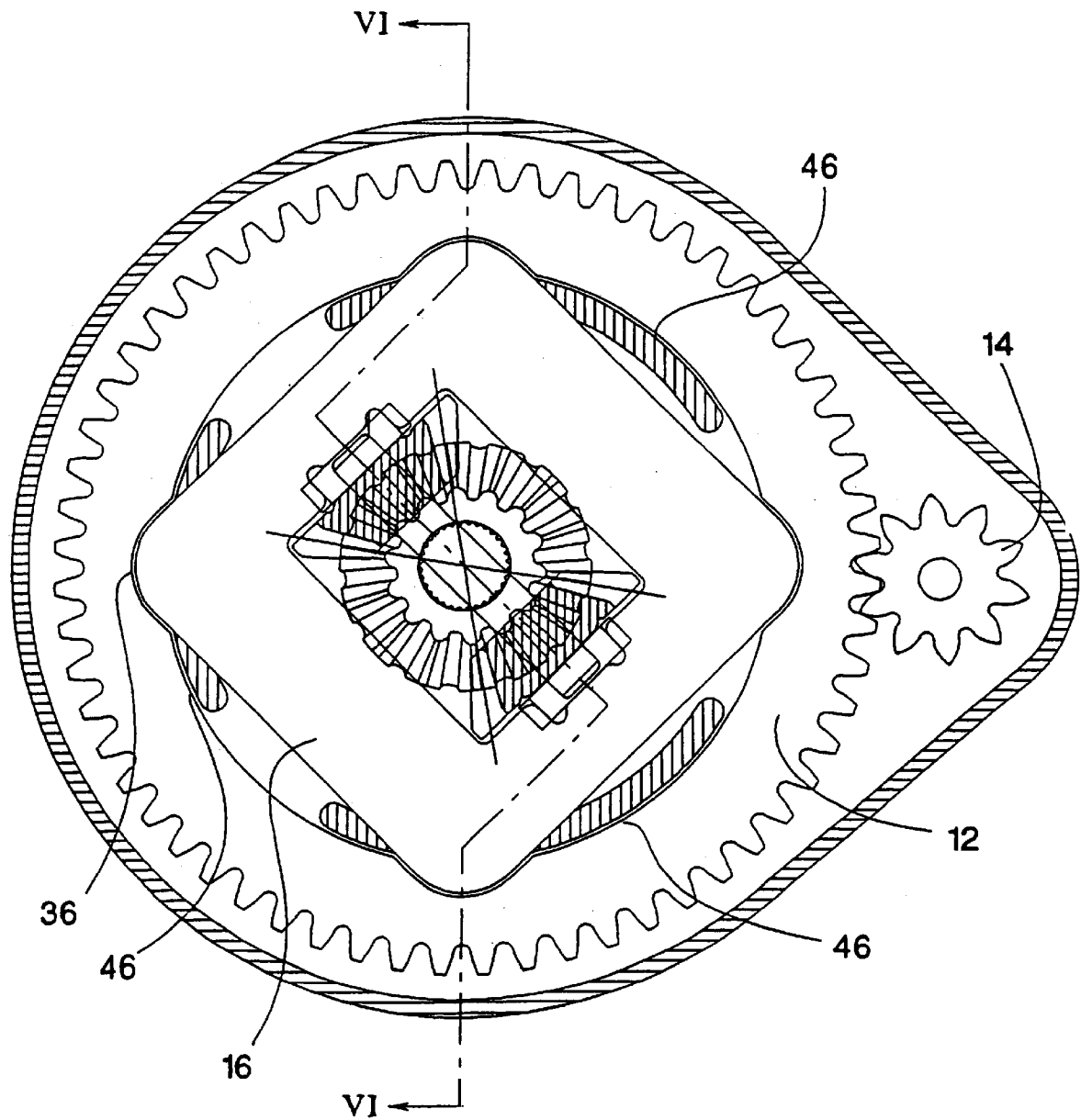
FIG. 5 illustrates a side view of a further embodiment of a transaxle drive differential assembly constructed in accordance with the present invention.
Figure 6:
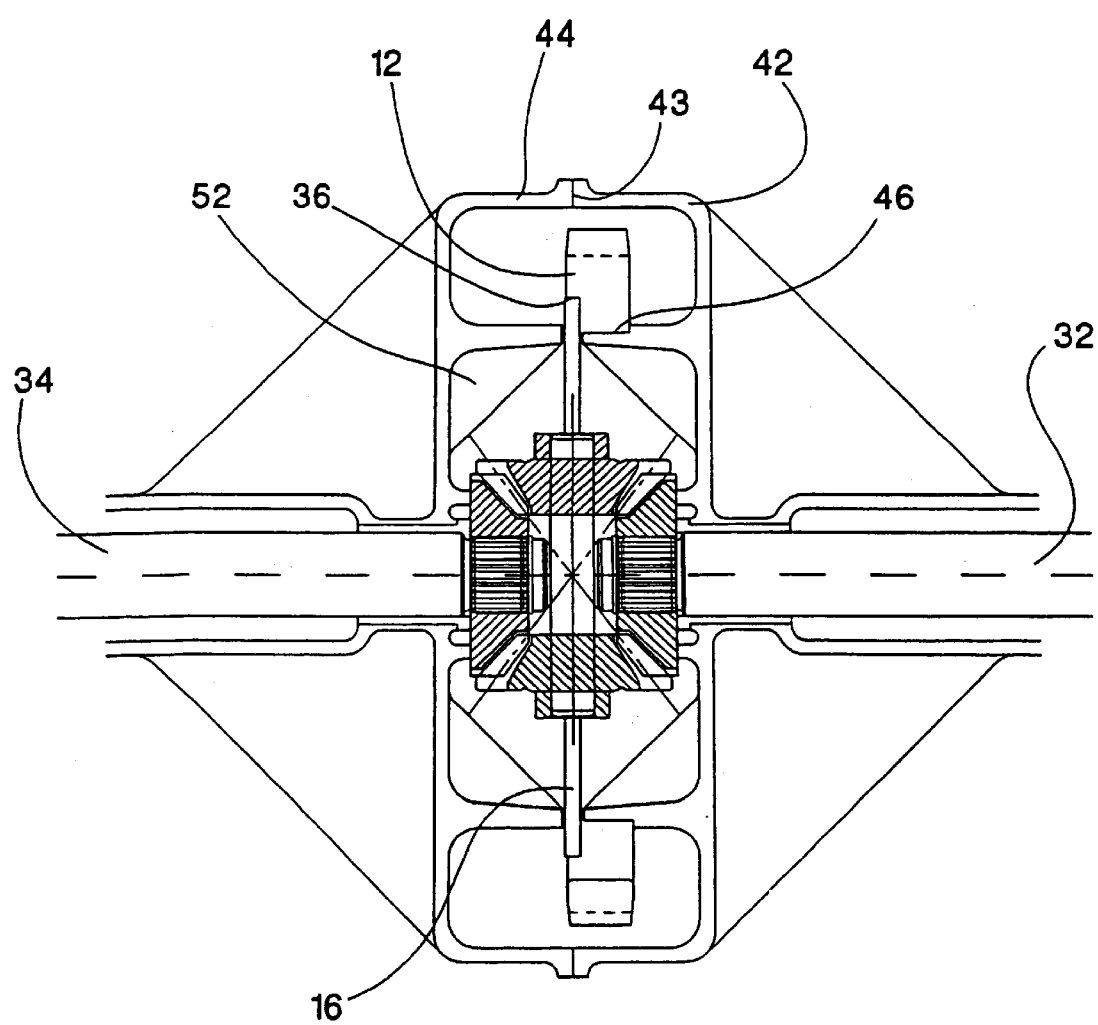
FIG. 6 illustrates a sectional view of the transaxle drive differential assembly of FIG. 5 along line VI—VI thereof.

While the bearing surfaces 46 have been illustrated as being circular in configuration where one main contact point, proximate to the input drive gear, absorbs the majority of the gear separating force, it is contemplated, as illustrated in FIG. 5, that the bearing surfaces may extend less than the full 360 degrees and yet support the ring gear 12. All that is required is sufficient bearing surfaces to accommodate the separating forces and to maintain the plate 16 within the ring gear 12. Additionally, it is contemplated that only one of the housing sections 42,44 may be provided with a bearing surface 48 while the other housing section 42,44 will cooperate therewith to maintain the ring gear 12 thereon. Specifically, as best seen in FIG. 6, the recesses 36 formed in the ring gear 12 may be offset from the center line thereof. In this manner, the inner circumference of the ring gear 12 will be supported upon one bearing surface 46 while the plate 16 is secured between the ring gear 12 and the opposite housing section.

Since, as described, the gear separating forces are absorbed by contact between the inner circumference of the ring gear 12 and the housing, the differential carrier plate 16 needs to be sized only to accommodate the required torque and to fill the gap between the ring gear and the differential bevel gears. Since the differential carrier plate 16 does not require high tolerances, the differential carrier plate 16 may be manufactured by a variety of techniques.

Figure 4:
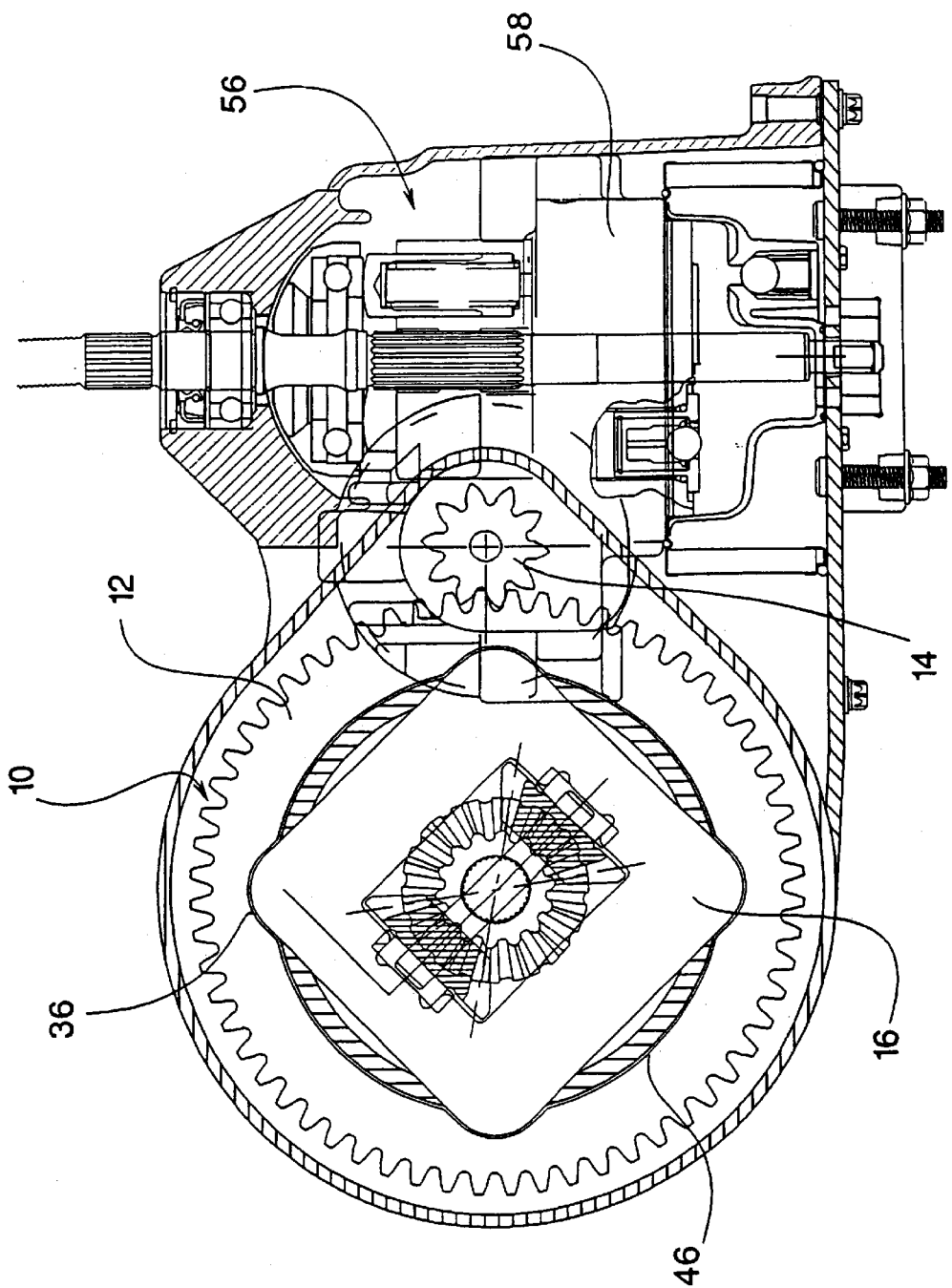
FIG. 4 illustrates a side view of the transaxle drive differential assembly of FIG. 1 used in conjunction with a hydrostatic transmission.

In the preferred embodiment of the invention, illustrated in FIG. 4, the differential assembly 10 is used in conjunction with a hydrostatic transmission or HST. The operation and components of an HST may be seen in U.S. Pat. No. 5,330,394, which is incorporated herein by reference in its entirety, and, as such, will not be described in greater detail herein. Generally, the interface requirements for utilizing the differential assembly 10 in a HST configuration are identical to those above described. In this arrangement, the input shaft 14 is connected to a hydraulic motor unit (not shown) which, in turn, is hydraulically connected to a hydraulic pump unit 56 which receives the motive force from the vehicle engine. More specifically, the hydrostatic transmission includes a center section 58 having hydraulic porting formed therein on which are mounted the hydraulic motor unit and hydraulic pump unit 56. The hydraulic porting functions to hydraulically link these two units. As will be understood from a reading of the '394 patent in connection with the operation of the differential assembly 10 above-described, the motive force from the vehicle engine is transferred to the hydraulic pump unit 56, hydraulic motor unit, input shaft 14, differential assembly 10, and axle shafts 32,34 to drive the wheels of the vehicle attached thereto.

From the foregoing, it will be apparent that the subject invention has the advantage of providing a fastenerless differential assembly having reduced complexity whereby the differential assembly may be more easily manufactured while achieving the benefits of the prior art. A further advantage is found in the fact that the ring gear may be made as small as possible without the need to machine or form discontinuities such as steps thereon. In this manner the ring gear can be manufactured at a great savings as compared to previously utilized ring gears.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any equivalent thereof.

What is claimed is:

1. A hydrostatic transaxle having a hydrostatic transmission and an input drive connected thereto, the transaxle further including a differential assembly comprising:

a housing having a bearing surface;

a ring gear supported by the bearing surface and drivingly connected to the input drive;

a differential carrier plate integrally formed with the ring gear; and a pair of oppositely disposed bearing blocks carried by the carrier plate.

2. A transaxle as set forth in claim 1, wherein each bearing block comprises oppositely disposed slots mating with the carrier plate.

3. A transaxle as set forth in claim 1, wherein said housing comprises a first housing section having a first bearing surface and a second housing section having a second bearing surface.

\* \* \* \* \*